United States Patent
Genoe et al.

(10) Patent No.: US 12,436,030 B2
(45) Date of Patent: Oct. 7, 2025

(54) DETECTOR FOR DETECTING ELECTROMAGNETIC RADIATION, IMAGE SENSOR, AND METHOD FOR DETECTING IMAGE INFORMATION

(71) Applicant: IMEC VZW, Leuven (BE)

(72) Inventors: Jan Genoe, Testelt (BE); Robert Gehlhaar, Herent (BE); Kristiaan De Greve, Heverlee (BE)

(73) Assignee: IMEC VZW, Leuven (BE)

( * ) Notice: Subject to any disclaimer, the term of this patent is extended or adjusted under 35 U.S.C. 154(b) by 422 days.

(21) Appl. No.: 18/004,368

(22) PCT Filed: Jun. 11, 2021

(86) PCT No.: PCT/EP2021/065808
§ 371 (c)(1),
(2) Date: Jan. 5, 2023

(87) PCT Pub. No.: WO2022/017681
PCT Pub. Date: Jan. 27, 2022

(65) Prior Publication Data
US 2023/0280208 A1    Sep. 7, 2023

(30) Foreign Application Priority Data
Jul. 21, 2020  (EP) .................................. 20186876

(51) Int. Cl.
*G01J 3/02*     (2006.01)
*G01J 3/28*     (2006.01)
*H10F 39/00*    (2025.01)

(52) U.S. Cl.
CPC .......... *G01J 3/0216* (2013.01); *G01J 3/2803* (2013.01); *G01J 3/2823* (2013.01); *H10F 39/806* (2025.01)

(58) Field of Classification Search
CPC ...... G01J 3/0216; G01J 3/2803; G01J 3/2823; G01J 3/0205; G01J 3/0256; H10F 39/806;
(Continued)

(56) References Cited

U.S. PATENT DOCUMENTS

2007/0200055 A1   8/2007   Reznik et al.
2019/0004212 A1*  1/2019   Astratov ............. H10F 39/8063

FOREIGN PATENT DOCUMENTS

| JP | 2017028059 A  | 2/2017  |
| WO | 2006131889 A2 | 12/2006 |
| WO | 2012099262 A1 | 7/2012  |

OTHER PUBLICATIONS

PCT International Search Report and Written Opinion, Application No. PCT/EP2021/065808, mailed Jul. 28, 2021, 11 pages.

* cited by examiner

*Primary Examiner* — James C. Jones
(74) *Attorney, Agent, or Firm* — McDonnell Boehnen Hulbert & Berghoff LLP

(57) ABSTRACT

Example embodiments relate to detectors for detecting electromagnetic radiation. One embodiment includes a detector for detecting electromagnetic radiation spanning a range from a first wavelength to a second wavelength. The detector includes an array of funnel elements for propagating electromagnetic radiation from a second plane towards a first plane. Each of the funnel elements includes an entrance end and an exit end. The entrance ends of the array of funnel elements define the second plane. The entrance end is larger than half of the second wavelength in a medium from which the electromagnetic radiation enters the detector. The exit end is smaller than half of the first wavelength of in the medium. The detector also includes an array of photosensitive elements for detecting electromagnetic radiation incident on the array of photosensitive elements. Each funnel (Continued)

element is associated with a photosensitive element. The array of photosensitive elements defines the first plane.

20 Claims, 10 Drawing Sheets

(58) Field of Classification Search
CPC .......... H10F 39/8067; H04N 2213/001; H04N 13/271; H04N 13/324
See application file for complete search history.

DETECTOR FOR DETECTING ELECTROMAGNETIC RADIATION, IMAGE SENSOR, AND METHOD FOR DETECTING IMAGE INFORMATION

CROSS-REFERENCE TO RELATED APPLICATIONS

The present application is a national stage entry of PCT/EP2021/065808 filed Jun. 11, 2021, which claims priority to EP 20186876.7 filed on Jul. 21, 2020, the contents of each of which are hereby incorporated by reference.

TECHNICAL FIELD

The present disclosure relates to a detector for detecting electromagnetic radiation, an image sensor and a method for detecting image information. In particular, the present disclosure relates to detecting three-dimensional information.

BACKGROUND

Electromagnetic radiation, e.g. including waves of ultraviolet light, visible light or infrared light, may be useful as information carriers in many different applications. Various detectors are therefore employed to record the electromagnetic radiation and transform it into an electric signal that can be processed and analysed.

In an imaging device, electromagnetic radiation may be recorded to acquire a two-dimensional image representing an environment. However, in many applications, three-dimensional information may be desired, such that depth information may be included in the acquired two-dimensional image information. Some depth information could be extracted using image processing of the acquired two-dimensional image, but such depth information may be limited by a depth of field of the imaging device. Alternatively, depth information may be acquired by recording additional information using e.g. additional equipment, such as using multiple imaging devices. However, it may be desirable to enable acquisition of three-dimensional image information using a single imaging device, such that acquisition of three-dimensional image information would be fast and not require complex equipment.

SUMMARY

The present disclosure enables fast acquisition of three-dimensional image information using relatively straightforward equipment. The present disclosure also provides a detector for detecting electromagnetic radiation comprising three-dimensional information.

These and other features are at least partly met by the independent claims. Additional embodiments are set out in the dependent claims.

According to a first aspect, there is provided a detector for detecting electromagnetic radiation spanning a range from a first wavelength to a second wavelength, wherein the first wavelength is a shortest wavelength in the range and the second wavelength is a longest wavelength in the range, the detector comprising: an array of funnel elements for propagating electromagnetic radiation from a second plane towards a first plane, wherein each of the funnel elements comprises an entrance end and an exit end, wherein the entrance ends of the array of funnel elements define the second plane, wherein the entrance end has a size larger than half of the second wavelength of electromagnetic radiation in a medium from which the electromagnetic radiation enters the detector for capturing electromagnetic radiation in focus at the second plane, and wherein the exit end has a size smaller than half of the first wavelength of electromagnetic radiation in the medium; and an array of photosensitive elements for detecting electromagnetic radiation incident on the array of photosensitive elements, wherein each funnel element is associated with a photosensitive element such that image information corresponding to electromagnetic radiation being in focus at the second plane is detected by the array of photosensitive elements and wherein the array of photosensitive elements define the first plane and is configured to further capture image information corresponding to electromagnetic radiation being in focus at the first plane.

Based on the presently described detector, electromagnetic radiation in focus in two different planes may be detected in the same array of photosensitive elements. Hence, image information corresponding to two different image planes may be detected in a single exposure. The two different image planes would correspond to two different distances to objects being imaged such that the image information including depth information providing three-dimensional information.

Based on the presently described funnel elements, electromagnetic radiation in focus at entrance ends of the of the funnel elements will be captured in the funnel elements so as to propagate within the funnel element to the exit end. Thus, electromagnetic radiation corresponding to a spot imaged onto the second plane will maintain a small spatial spread while the electromagnetic radiation propagates in the funnel element towards the first plane.

Since the entrance end has a size larger than half of the longest wavelength that is to be detected, the electromagnetic radiation in focus at the second plane is captured to propagate in the funnel element. On the other hand, electromagnetic radiation that is not in focus in the second plane, for instance electromagnetic radiation which that is in focus in the first plane, may have a spot size at the second plane that is substantially larger than the entrance end of the funnel element and may pass the funnel elements to the first plane such that the electromagnetic radiation is neither refracted nor guided by the funnel entrance and will propagate uninfluenced to the first plane with the funnel element having virtually no effect on the electromagnetic radiation. Hence, the electromagnetic radiation corresponding to a spot imaged onto the first plane may be captured in focus at the first plane. Also, based on the exit end of the funnel elements having a size smaller than half of the shortest wavelength, i.e. smaller than a diffraction limit for imaging, electromagnetic radiation will not be captured by the funnel element along an extension of the funnel element between the second plane and the first plane. Therefore, the funnel elements will not affect imaging of electromagnetic radiation that is in focus at the first plane.

As mentioned above, the entrance end has a size larger than half of the longest wavelength that is to be detected. However, the size of the entrance end will affect resolution of imaging by the detector, such that the entrance end may be chosen in relation to a desired resolution. For instance, the entrance end may be as small as possible while having a size larger than half of the longest wavelength in order to enable imaging with maximum resolution.

The electromagnetic radiation that is detected by the detector may span a relatively broad range of wavelengths. For instance, the detector may detect electromagnetic radiation in an ultraviolet range and/or in a visible range and/or in an infra red range, such as short-wave infrared radiation. In an embodiment, the detector may detect electromagnetic radiation in the visible range, such as electromagnetic radiation spanning 380-740 nm, or electromagnetic radiation spanning 400-700 nm, or electromagnetic radiation spanning 440-660 nm.

The wavelength of electromagnetic radiation is dependent on a refractive index of a medium in which the electromagnetic radiation propagates. Hence, a spot size may be affected by the medium in which the electromagnetic radiation propagates. The electromagnetic radiation may propagate in a medium from which the electromagnetic radiation enters the detector to reach the entrance end of the funnel element. Depending on the medium in which electromagnetic radiation propagates, the spot size to be captured by the entrance end of the funnel element may therefore differ. Thus, the entrance end should have a size larger than half of the second wavelength of electromagnetic radiation, wherein the second wavelength is defined by the medium from which the electromagnetic radiation enters the detector. It should be realized that the electromagnetic radiation may enter the detector when the electromagnetic radiation enters the entrance end of the funnel elements. However, there may be one or more layers integral with the funnel elements such that the electromagnetic radiation may enter such layers before reaching the entrance ends of the funnel elements. For example, as described below, the detector may comprise additional arrays of funnel elements above the array of funnel elements. As used herein, the medium from which the electromagnetic radiation enters the detector should be construed as a medium from which the electromagnetic radiation enters a material that is integral with the array of funnel elements. Typically, the electromagnetic radiation may propagate in air, having a refractive index about 1, before reaching the entrance ends of the funnel elements. However, according to an embodiment, the entrance ends of the funnel elements may be immersed in another medium, such as water or an immersion oil, so as to provide a different refractive index of the medium in which electromagnetic radiation propagates and to allow the entrance end of the funnel element to be smaller while still capturing electromagnetic radiation being in focus in the second plane.

The funnel elements in the array may extend in parallel between the entrance ends and the exit ends.

It should be realized that the entrance ends and the exit ends of the funnel elements may have any shape. The size of the entrance ends and the exit ends should be construed as a maximum dimension of the entrance ends and the exit ends between opposing side walls of the funnel element. Thus, for rectangular entrance ends and exit ends, the size of the entrance ends and exit ends would correspond to the larger of the width and height of the rectangular shape. For circular entrance ends and exit, the size of the entrance ends and the exit ends would correspond to a diameter of the circular shape. According to an embodiment, the entrance ends and exit ends of the funnel elements are square-shaped.

The exit ends of the funnel elements may be arranged at or close to the first plane. However, according to an alternative, each funnel element may transition into a waveguide having a constant or slowly changing (e.g. slightly tapered) cross-section along a length of the waveguide. In such case, exit ends of the waveguides may be arranged at or close to the first plane.

The funnel elements or waveguides may be aligned with each other such that their respective exit ends, through which the guided electromagnetic radiation exits the funnel elements or waveguides, are arranged on, or at the same distance from, the array of photosensitive elements. In some embodiments, the exit ends as close to the photosensitive elements as possible, or even in an abutting manner, so as to provide a near-field configuration and allow for further downscaling of the detector.

According to an embodiment, the funnel elements has at least one sidewall that is non-parallel to an extension of the funnel element from the entrance end to the exit end.

Thus, a decrease in size of a cross-section of the funnel element between the entrance end and the exit end may be provided by the at least one sidewall being non-parallel to the extension of the funnel element.

In some embodiments, all sidewalls of the funnel element may be equally tapered such that the funnel element is symmetrical around a line that is orthogonal to the entrance end and the exit end.

According to an embodiment, an adiabatic tapering of the funnel element is provided such that an angle of a sidewall to a normal to the entrance and exit ends increases towards the exit end. This may ensure that electromagnetic radiation captured at the entrance end is propagated within the funnel element to the exit end and may be important if a steep tapering of the funnel element is used.

However, according to another embodiment, the at least one sidewall may extend along a straight line between the entrance end and the exit end. This implies that a shape of the funnel element is straightforward and may still provide a funnel element that effectively propagates the electromagnetic radiation captured at the entrance end to the exit end, in particular if a length of the funnel element is larger or much larger than a size of the wavelength of electromagnetic radiation.

According to an embodiment, the detector further comprises a first array of waveguides, wherein each waveguide is configured to guide electromagnetic radiation from the exit end of a funnel element to a photosensitive element.

Electromagnetic radiation captured at the entrance end of funnel elements may be guided through the funnel element to the exit end and then be guided by a waveguide from the exit end to a photosensitive element. Thus, electromagnetic radiation may be guided through both the funnel element and the waveguide. The funnel element and the waveguide may be integral and formed in one piece. Thus, the funnel element and the waveguide may form different sections within a single component.

The change in cross-section along a length of the sections may differ between the funnel elements and the waveguides. Hence, the funnel elements may be called funnel elements because a rate of change of a size of the cross-section along the funnel element may be relatively large compared to a rate of change of a size of the cross-section along the waveguide. For instance, the waveguides may have constant or almost constant cross-section along their length. The waveguides may alternatively be tapered, such that an angle between a sidewall of a waveguide and a cross-section of the waveguide may be less than 90°, such as approximately 85°. This may be useful for manufacturing of the detector as the waveguides may be formed in an etching step providing an etch angle.

According to an embodiment, the waveguides comprise a first waveguide portion and a second waveguide portion, wherein the first waveguide portion is configured to guide electromagnetic radiation within a wavelength range and wherein the second waveguide extends in parallel with the first waveguide portion and is configured to selectively guide electromagnetic radiation within a sub-range of the wavelength range, and wherein the second waveguide portion is coupled to the first waveguide portion and configured to out-couple electromagnetic radiation from the first waveguide portion within the sub-range of the wavelength range.

By out-coupling electromagnetic radiation of the sub-range from the first waveguide portion, a colour-splitting of the incoming light is enabled, which in turn allows for a sensitivity enhancement of the detector. The sensitivity may in particular be increased in relation to other technologies utilising colour filters to filter out different wavelengths from the incoming light. Using out-coupling of electromagnetic radiation of a sub-range from the first waveguide portion, it is possible to discriminate different wavelengths without using colour filters for controlling the wavelengths reaching the photosensitive elements.

The first waveguide portion may be referred to as a "full spectrum" waveguide, which should be understood as a waveguide capable of guiding a broader wavelength range than the second waveguide portion. In some embodiments, the first waveguide portion is a full spectrum waveguide in the sense that it, during use, may transmit electromagnetic radiation within the visible wavelength range. The first waveguide portion may be designed in relation to the electromagnetic waves to be guided by the first waveguide portion. Dimensions of the first waveguide portion need hence not be limited for use with a single specific wavelength of the electromagnetic radiation. Rather, the first waveguide portion may be used with a range of wavelengths, while providing desired propagation properties.

The second waveguide portion may be referred to as a "colour splitting" waveguide, referring to its capability of out-coupling electromagnetic radiation within a sub-range of the wavelength range of the electromagnetic radiation received by the first waveguide portion. Thus, the second waveguide portion may be understood as a waveguide capable of sorting out certain colours of incoming visible light, such as for instance a sub-range of wavelengths corresponding to red, green or blue light. Similar to the first waveguide portion, the second waveguide portion may hence be designed in relation to the electromagnetic waves to be guided by the second waveguide portion. Dimensions of the second waveguide portion need therefore not be limited for use with a specific wavelength of the electromagnetic radiation, but rather a sub-range of wavelengths corresponding to for example a red, green or blue spectrum while providing desired propagation properties.

According to an embodiment, the array of funnel elements is a first array of funnel elements and wherein the detector further comprises a second array of funnel elements for propagating electromagnetic radiation from a third plane towards the first plane, wherein each of the funnel elements of the second array comprises an entrance end and an exit end, wherein the entrance ends of the second array of funnel elements define the third plane, wherein the entrance end has a size larger than half of the second wavelength of electromagnetic radiation in the medium for capturing electromagnetic radiation in focus at the third plane, and wherein the exit end has a size smaller than half of the first wavelength of electromagnetic radiation in the medium.

Based on the presently described second array of funnel elements defining a third plane, electromagnetic radiation in focus in an additional plane (three different planes) may be detected in the same array of photosensitive elements. Hence, image information corresponding to three different image planes may be detected in a single exposure. This implies that further depth information may be acquired to improve the three-dimensional information.

It should be realized that the detector may comprise one or more additional arrays of funnel elements such that image information from even further image planes may be captured. Thus, adding additional arrays of funnel elements may ensure that more depth information may be captured by the detector.

According to an embodiment, the detector further comprises an array of intermediate waveguides, wherein each intermediate waveguide is configured to guide electromagnetic radiation from the exit end of a funnel element of the second array to an entrance end of a funnel element of the first array.

The electromagnetic radiation captured in focus in the third plane may be propagated in the funnel element and possibly in the intermediate waveguide to reach the entrance end of funnel elements of the first array. Thus, electromagnetic radiation corresponding to a spot imaged onto the third plane will maintain a small spatial spread in the second plane defined by the entrance ends of the funnel elements of the first array. Thus, the electromagnetic radiation being in focus in the third plane will also be captured into the entrance ends of the funnel elements of the first array and may be further propagated therein towards the first plane.

A funnel element of the second array and an intermediate waveguide may be integral and formed in one piece. Thus, the funnel element and the intermediate waveguide may form different sections within a single component.

The change in cross-section along a length of the sections may differ between the funnel elements and the intermediate waveguides. Hence, the funnel elements may be called funnel elements because a rate of change of a size of the cross-section along the funnel element may be relatively large compared to a rate of change of a size of the cross-section along the waveguide. For instance, the intermediate waveguides may have constant or almost constant cross-section along their length. The intermediate waveguides may alternatively be tapered, such that an angle between a sidewall of an intermediate waveguide and a cross-section of the intermediate waveguide may be less than 90°, such as approximately 85°. This may be useful for manufacturing of the detector as the intermediate waveguides may be formed in an etching step providing an etch angle.

In an embodiment, some intermediate waveguides in the array of intermediate waveguides may extend from the third plane to the second plane and not be associated with a funnel element of the second array. This implies that such intermediate waveguides not associated with a funnel element would not contribute in the additional capturing of electromagnetic radiation in the third plane. This may facilitate extraction of the image information corresponding to electromagnetic radiation being in focus at the second plane (as not all photosensitive elements receiving such image information would also receive image information corresponding to electromagnetic radiation being in focus at the third plane), while still allowing additional capturing of electromagnetic radiation to be performed.

According to another embodiment, the detector further comprises a second array of waveguides, wherein each waveguide in the second array is configured to guide electromagnetic radiation from the exit end of a funnel element of the second array to a photosensitive element.

This implies that electromagnetic radiation may be guided through the second array of waveguides from the third plane past the second plane to the first plane. Thus, the electromagnetic radiation captured in the second array of funnel elements is not captured by the first array of funnel elements.

The second array of waveguides may thus extend through the second plane, each waveguide in the second array being arranged between adjacent entrance ends of funnel element of the first array. However, the cross-section of the waveguides of the second array may be relatively small within the second plane and may therefore not interfere substantially with capturing of electromagnetic radiation in the second plane.

Based on the presently described waveguides of the second array guiding electromagnetic radiation to the photosensitive elements, different photosensitive elements may receive image information corresponding to electromagnetic radiation being in focus in the third and second planes, respectively. This implies that extraction of image information corresponding to the respective image plane may be simplified, as individual photosensitive elements capture information relating to fewer image planes.

According to an embodiment, the array of photosensitive elements comprises different sets of photosensitive elements for capturing image information corresponding to electromagnetic radiation being in focus at different planes.

It should be realized that electromagnetic radiation that is not captured for transfer to a particular photosensitive element will still reach the array of photosensitive elements. However, an obtained spot will be large for electromagnetic radiation that is not in focus, resulting in a corresponding intensity of the electromagnetic radiation that is small in a single photosensitive element. This implies that the image information that is captured in focus and transferred to a dedicated photosensitive element will have a high intensity in the dedicated photosensitive element and, in this respect, different sets of photosensitive elements may detect a high intensity of electromagnetic radiation in relation to the electromagnetic radiation being in focus at different planes.

By having different sets of photosensitive elements dedicated to electromagnetic radiation being in focus at different planes, a particular set of photosensitive elements may be selected and analyzed when image information corresponding to a particular depth in the image is of interest.

According to an embodiment, the funnel elements are formed by a high refractive index material and are surrounded by a lower refractive index material.

As used herein, high refractive index material should be construed as a material at least having a refractive index that is larger than the refractive index of the lower refractive index material surrounding the high refractive index material.

This may imply that electromagnetic radiation captured by a funnel element may be prevented from leaving the funnel element to the surrounding material due to total internal reflection of the electromagnetic radiation in the funnel elements.

Based on the presently described funnel elements being formed by a high refractive index material, a wavelength of electromagnetic radiation will be small within the funnel element (compared e.g. to a wavelength of the electromagnetic radiation in air). This implies that the exit end of the funnel element may be very small and may allow electromagnetic radiation to be guided to a very small photosensitive element, which may be much smaller than a wavelength of the electromagnetic radiation in air. This may imply that a pitch between photosensitive elements may be very small and may allow imaging with high resolution even though different photosensitive elements are dedicated to receiving image information that corresponds to electromagnetic radiation being in focus at different planes.

In an embodiment, the high refractive index material is silicon nitride, $Si_3N_4$, whereas the lower refractive index material is silicon dioxide, $SiO_2$.

According to an embodiment, the photosensitive element comprises a photoactive layer for generating a signal corresponding to an amount of incident electromagnetic radiation on the photoactive layer.

The photoactive layer may have a very short absorption length in order to facilitate absorption of the incident electromagnetic radiation. The photoactive layer may for instance comprise a perovskite material, an organic material, a quantum dot and/or amorphous germanium.

According to an embodiment, the photosensitive element further comprises an interconnect layer for transferring the signal from the photoactive layer to a semiconductor circuit.

The photosensitive element may be understood as an element capable of transforming incident electromagnetic radiation, such as visible light, into an electrical signal. The photosensitive element may for example comprise a contact layer, a photoactive layer and an interconnect layer arranged on a semiconductor substrate. The photoactive layer may be arranged for converting photons into an electrical current. The interconnect layer may be arranged between the photoactive layer and the substrate. The interconnect layer may comprise electrodes to conduct the electric current in the photoactive layer to electric circuits and devices suitable for reading and processing the electric signal. The contact layer may be un-patterned, extending as a uniform layer in between the waveguides for transferring electromagnetic radiation to the photosensitive elements and the photoactive layer. The photoactive layer may be patterned into separate regions, for example corresponding to each of the waveguides, or be formed as a uniform layer extending below the waveguides. In some embodiments, the interconnect layer may be patterned into a plurality of electrodes or electrode regions, which for example may be aligned with a respective one of the waveguides.

The interconnect layer may hence comprise a first electrode associated with a first waveguide portion, and a second electrode associated with a second waveguide portion. The first electrode may be arranged below the first waveguide portion to register electromagnetic radiation guided through the first waveguide portion, whereas the second electrode may be arranged below the second waveguide portion to register electromagnetic radiation guided through the second waveguide portion.

Further, the first and second electrodes, and/or the portion of the photoactive layer arranged between the first and second electrodes and their respective waveguide portion, may be provided with thickness that is individually adjusted to the specific wavelength range to be detected that may be determined by the first and the second waveguide portions, respectively. Hence, the electrode and/or photoactive layer portion under the first waveguide portion may be thicker and the electrode and/or photoactive layer portion under the second waveguide portion, and vice versa. This may improve the overall performance of the photosensitive elements.

According to an embodiment, the detector comprises a single lens for focusing incident electromagnetic radiation towards the array of funnel elements and the array of photosensitive elements.

Thus, the detector may provide capturing of image information including depth information providing three-dimensional information using a single lens and without a need to provide a movement of the lens in relation to the array of photosensitive elements.

According to an embodiment, the detector further comprises a filter for extracting image information corresponding to electromagnetic radiation being in focus at a particular plane.

The detector enables capturing of image information including depth information providing three-dimensional information. The filter may be configured to extract image information corresponding to a particular plane from the captured image information. Thus, information at a particular depth may be selectively extracted from the captured image information.

The filter may be provided as software instruction for causing a processing unit to extract the image information. However, the filter may alternatively be provided as hardware configured to process the captured image information.

According to a second aspect, there is provided an image sensor comprising the detector according to the first aspect, wherein the image sensor is configured to detect three-dimensional image information based on simultaneously capturing image information in at least two image planes.

Effects and features of this second aspect are largely analogous to those described above in connection with the first aspect. Embodiments mentioned in relation to the first aspect are largely compatible with the second aspect.

The image sensor may use the detector of the first aspect to simultaneously capture image information corresponding to electromagnetic radiation being in focus in at least two different image planes. Hence, the image sensor may detect three-dimensional image information in a single exposure. This implies that the image sensor may very quickly (in a single exposure) capture three-dimensional image information, while the image sensor is straightforward and may only include a single array of photosensitive elements.

According to a third aspect, there is provided a method for detecting image information, the method comprising: capturing electromagnetic radiation spanning a range from a first wavelength to a second wavelength, wherein the first wavelength is a shortest wavelength in the range and the second wavelength is a longest wavelength in the range, wherein the electromagnetic radiation is captured at an array of funnel elements for propagating electromagnetic radiation from a second plane towards a first plane, wherein the entrance end of each funnel element has a size larger than half of the second wavelength of electromagnetic radiation in a medium from which the electromagnetic radiation enters the detector for capturing electromagnetic radiation in focus at the second plane; at an array of photosensitive elements, simultaneously detecting electromagnetic radiation being captured by the array of funnel elements for detecting image information corresponding to electromagnetic radiation being in focus at the second plane and detecting electromagnetic radiation having passed the array of funnel elements for detecting image information corresponding to electromagnetic radiation being in focus at the first plane.

Effects and features of this third aspect are largely analogous to those described above in connection with the first and second aspects. Embodiments mentioned in relation to the first and second aspects are largely compatible with the third aspect.

The simultaneous detection of electromagnetic radiation being in focus at different planes allows very fast capture of three-dimensional image information.

BRIEF DESCRIPTION OF THE DRAWINGS

The above, as well as additional, features will be better understood through the following illustrative and non-limiting detailed description, with reference to the appended drawings. In the drawings like reference numerals will be used for like elements unless stated otherwise.

DETAILED DESCRIPTION

Figure 1:
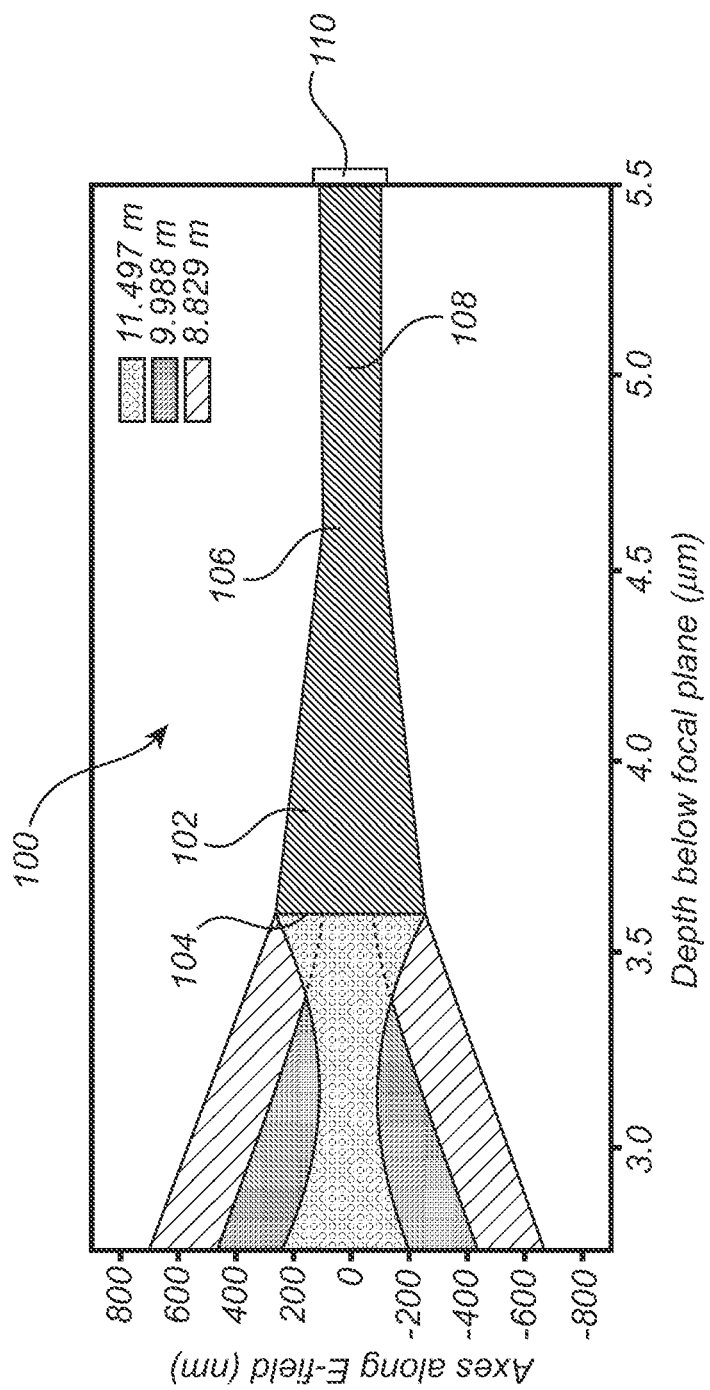
FIG. 1 is a schematic view of a component comprising a funnel element and a waveguide for guiding electromagnetic radiation illustrating capturing of electromagnetic radiation, according to example embodiments.

Referring now to FIG. 1, detection of electromagnetic radiation being in focus at plural image planes will be described.

In FIG. 1, a component 100 for guiding electromagnetic radiation is shown. The component 100 comprises a funnel element 102 for capturing electromagnetic radiation. As shown in FIG. 1, the funnel element 102 may be configured to capture electromagnetic radiation being in focus at an entrance end 104 of the funnel element 102. Thus, electromagnetic radiation corresponding to a spot being imaged onto the entrance end 104 of the funnel element 102 may be propagated within the funnel element 102 such that the electromagnetic radiation may be guided towards a photosensitive element 110 associated with the funnel element 102. This implies that the photosensitive element 110 may be able to receive image information corresponding to electromagnetic radiation being in focus at the entrance end 104 of the funnel element 102, such that image information corresponding to a plane in which the funnel element 102 is arranged may be sharp at a plane in which the photosensitive element 110 is arranged.

The funnel element 102 may be tapered between the entrance end 104 and an exit end 106. The entrance end 104 may have a size that is larger than half of a wavelength of the electromagnetic radiation, whereas the exit end 106 may have a size that is smaller than half of a wavelength of the electromagnetic radiation. As a consequence, electromagnetic radiation that is focused at the entrance end 104 is captured by the funnel element 102 to be propagated therein. However, the funnel element 102 is transparent to electromagnetic radiation having spot or beam diameters larger than about half the wavelength of electromagnetic radiation, which implies that electromagnetic radiation that is not in focus at the entrance end 104 of the funnel element 102 may pass the funnel element 102 unaffected towards the photosensitive element 110. This implies that the photosensitive element 110 may receive electromagnetic radiation being in focus at the plane of the entrance end 104 of the funnel element 102 and electromagnetic radiation being in focus at the plane of the photosensitive element 110. Thus, the photosensitive element 110 may capture image information being in focus at two planes, i.e. the plane of the entrance end 104 of the funnel element 102 and the plane of the photosensitive element 110.

It should be realized that the photosensitive element 110 may also receive electromagnetic radiation which is not in focus at the above-mentioned planes. However, a spot size that is not in focus may be smeared out across a plurality of photosensitive elements 110 such that intensity of electromagnetic radiation at a single photosensitive element 110 will be so small that it will not affect a possibility of sharp imaging of the electromagnetic radiation being in focus at the plane of the entrance end 104 of the funnel element 102 and the plane of the photosensitive element 110.

The electromagnetic radiation that is to be detected using the photosensitive element 110 may span a relatively broad range of wavelengths from a first, shortest wavelength to a second, longest wavelength. For instance, electromagnetic radiation in an ultraviolet range and/or in a visible range and/or in an infra red range, such as short-wave infrared radiation, may be detected. In an embodiment, electromagnetic radiation in the visible range, such as electromagnetic radiation spanning 380-740 nm, or electromagnetic radiation spanning 400-700 nm, or electromagnetic radiation spanning 440-660 nm, may be detected.

The wavelength of electromagnetic radiation is dependent on a refractive index of a medium in which the electromagnetic radiation propagates. Hence, a spot size may be affected by the medium in which the electromagnetic radiation propagates. The electromagnetic radiation may propagate in a medium before reaching the entrance end 104 of the funnel element 102. Depending on the medium in which electromagnetic radiation propagates, the spot size to be captured by the entrance end 104 of the funnel element 102 may therefore differ. Thus, the entrance end 104 should have a size larger than half of the second wavelength of electromagnetic radiation, wherein the second wavelength is defined by the medium in which the electromagnetic radiation propagates before reaching the entrance end 104 of the funnel element 102. Typically, the electromagnetic radiation may propagate in air, having a refractive index about 1, before reaching the entrance end 104 of the funnel elements 102. However, according to an embodiment, the entrance end 104 of the funnel element 102 may be immersed in another medium, such as water or an immersion oil, so as to provide a different refractive index of the medium in which electromagnetic radiation propagates and to allow the entrance end 104 of the funnel element 102 to be smaller while still capturing electromagnetic radiation being in focus at the entrance end 104 of the funnel element 102.

As illustrated in FIG. 1, the entrance end 104 of the funnel element 102 may capture electromagnetic radiation corresponding to a range of distances between a lens and an object. In the embodiment shown in FIG. 1, the lens has a focal length of 6 mm and the entrance end 104 of the funnel element 102 is arranged at a distance 3.6 µm below a focal plane of the lens, i.e. 6.0036 mm from the lens. The funnel element 102 is configured to capture electromagnetic radiation from a distance of about 9-11.5 m from the lens, whereas for electromagnetic radiation from different distances, the component 100 is optically transparent. The range of distances from which electromagnetic radiation is captured indicated above applies to green light (wavelength of 550 nm). It should be realized that the range will slightly differ for other wavelengths, such as 9.3-11.2 m for red light and 8.3-11.9 m for blue light, but electromagnetic radiation will still be captured from approximately the same range of distances for differing wavelengths.

The size of the entrance end 104 and the exit end 106 should be construed as a maximum dimension of the entrance end 106 and the exit end between opposing side walls of the funnel element 102. Thus, the size of the entrance end 104 and the exit end 106 may correspond to a side of a square-shape or may correspond to a diameter of a circular shape.

The funnel element 102 may be tapered such that the funnel element 104 is symmetrical around a line that is orthogonal to the entrance end 104 and the exit end 106. For example, if the funnel element 102 has a square cross-section, all sidewalls may be equally angled between the entrance end 104 and the exit end 106.

The funnel element 102 may have a relatively gentle tapering by having a relatively long distance between the entrance end 104 and the exit end 106 compared to the difference in size between the entrance end 104 and the exit end 106. For instance, as indicated in FIG. 1, an angle between a sidewall of the funnel element 102 and a cross-section of the intermediate waveguide may be approximately 85°.

As shown in FIG. 1, the component 100 may comprise two sections, the funnel element 102 transitioning into a second section, which is herein called a waveguide 108. As shown in FIG. 1, the funnel element 102 may have a tapered cross-section, whereas the waveguide 108 may have a constant cross-section. The two sections of the component 100 may differ in that a rate of change of a size of the cross-section is larger in the funnel element 102 than in the waveguide 108. However, the waveguide 108 may also have a tapered cross-section. For instance, the funnel element 102 may have a steep tapering followed by a waveguide with a gentle tapering. This may particularly be useful if the entrance end 104 of the funnel element 102 is relatively large.

The funnel element 102 may have a constant rate of change of the size of the cross-section, such that the funnel element 102 may comprise planar sidewalls. However, in particular if a steep tapering is used, the sidewalls of the funnel element 102 may be configured to provide an adiabatic tapering.

The component 100 need not necessarily comprise two sections. Rather, the component 100 may comprise only the funnel element 102 such that the exit end 106 of the funnel element 102 is also an exit end of the component 100 and the component 100 comprises no waveguide 108.

The component 100 may be arranged directly on the photosensitive element 110 such that an end surface (of the funnel element 102 or the waveguide 108), through which the guided light may exit the component 100 is in direct contact with the photosensitive element 110. However, it should be realized that there may alternatively be a small distance between the end surface of the component 100 and the photosensitive element 110.

The component 100 may be formed by a high refractive index material and may be surrounded by a lower refractive index material. The funnel element 102 may thus be configured to propagate electromagnetic radiation therein using total internal reflection.

Also, the high refractive index material may imply that a wavelength of electromagnetic radiation will be small within the funnel element 102 compared to a wavelength of the electromagnetic radiation in air. This implies that the exit end 106 of the funnel element 102 may be very small and may allow electromagnetic radiation to be guided to a very small photosensitive element 110, which may be much smaller than a wavelength of the electromagnetic radiation in air.

In an embodiment, the high refractive index material is silicon nitride, $Si_3N_4$, whereas the lower refractive index material is silicon dioxide, $SiO_2$. However, it should be realized that other materials may be used providing high refractive index.

Figure 2:
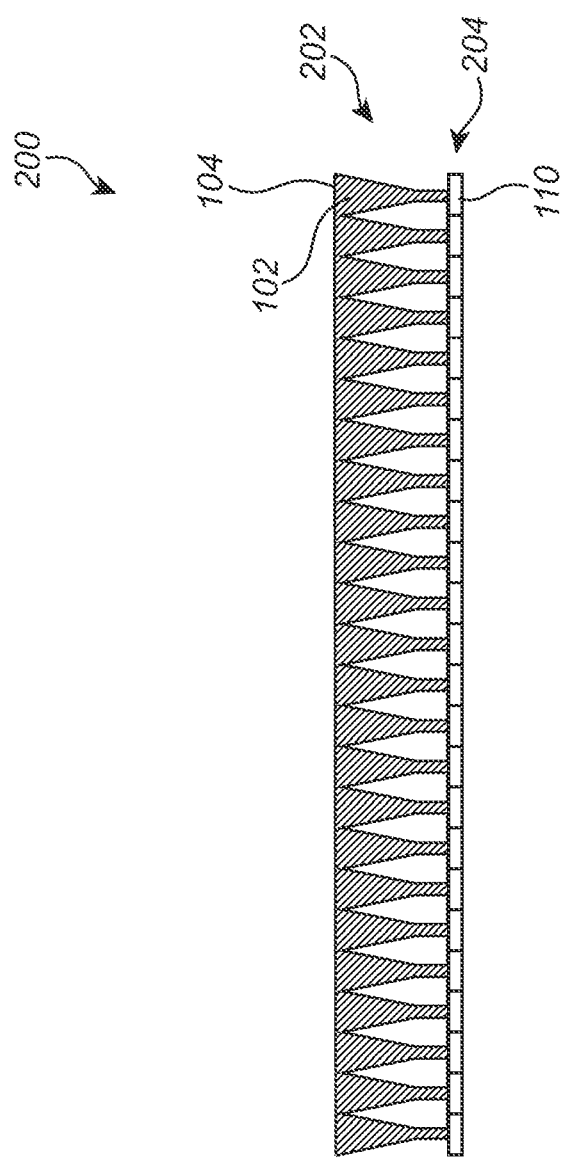
FIG. 2 is a schematic view of a detector, according to example embodiments.

Referring now to FIG. 2, a detector 200 will be described. The detector 200 comprises an array 202 of funnel elements 102 within components 100 as described above with reference to FIG. 1. The detector 200 further comprises an array 204 of photosensitive elements 110, wherein each funnel element 102 is associated with a photosensitive element 110 of the array 204.

The array 204 of photosensitive elements 110 may define a first plane. The array of photosensitive elements 110 may be configured to detect image information corresponding to electromagnetic radiation being in focus at the first plane.

The entrance ends 104 of the funnel elements 102 in the array 202 may further define a second plane. As a result of capturing the electromagnetic radiation that is in focus in the second plane by the funnel elements 102 and the propagation of the captured electromagnetic radiation towards the photosensitive elements 110 by the array 202 of funnel elements 102 and an array of waveguides 108, the array of photosensitive elements 110 may further be configured to detect image information corresponding to electromagnetic radiation that is in focus at the second plane.

Hence, the detector 200 may provide two focal planes such that image information may be captured by the detector 200 providing depth information in addition to the two-dimensional imaging provided by the array 204 of photosensitive elements 110. This implies that the detector 200 is configured to capture three-dimensional image information and the detector 200 may further capture the three-dimensional image information using a single array 204 of photosensitive elements 110 in a single exposure, without need of any movable parts.

Figure 3:
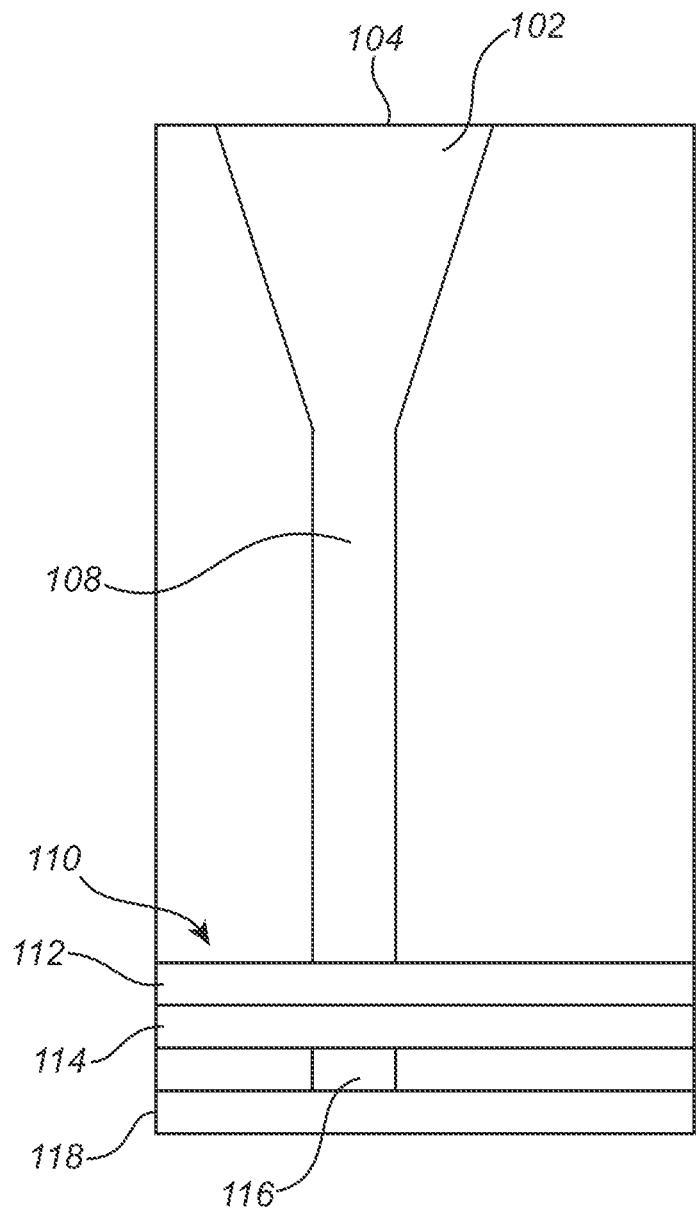
FIG. 3 is a schematic view of a photosensitive element, according to example embodiments.

Referring now to FIG. 3, a photosensitive element 110 according to an embodiment is disclosed. The photosensitive element 110 may comprise a photoactive layer 114 configured to respond to photons photoelectrically, thereby allowing the guided electromagnetic radiation to form an electric signal that can be measured. The photoactive layer 114 may for example be a layer of amorphous silicon, amorphous germanium, perovskite, an organic material or a quantum dot.

The photoactive layer 114 may be covered by a contact layer 112, such as an optically transparent and electrically conducting layer arranged between the photoactive layer 114 and the component 100. The contact layer 112 may for example comprise indium tin oxide, ITO.

The photoactive layer 114 may be provided above a substrate 118, such as for example a silicon substrate 118, being a front-end-of-line substrate comprising transistors and other devices for handling the electric signal generated by the guided electromagnetic radiation. Further, an interconnect layer 116 may be arranged between the photoactive layer 114 and the substrate 118 for transmitting the signal between the two. The interconnect layer 116 may comprise a plurality of electrodes, each of which being arranged to contact the photoactive layer 114 at positions corresponding to the positions in which the guided electromagnetic radiation is transmitted to the photoactive layer 114 by a component 100. Preferably, the electrodes are arranged as close as possible to the components 100, such as 500 nm or less.

Figure 4:
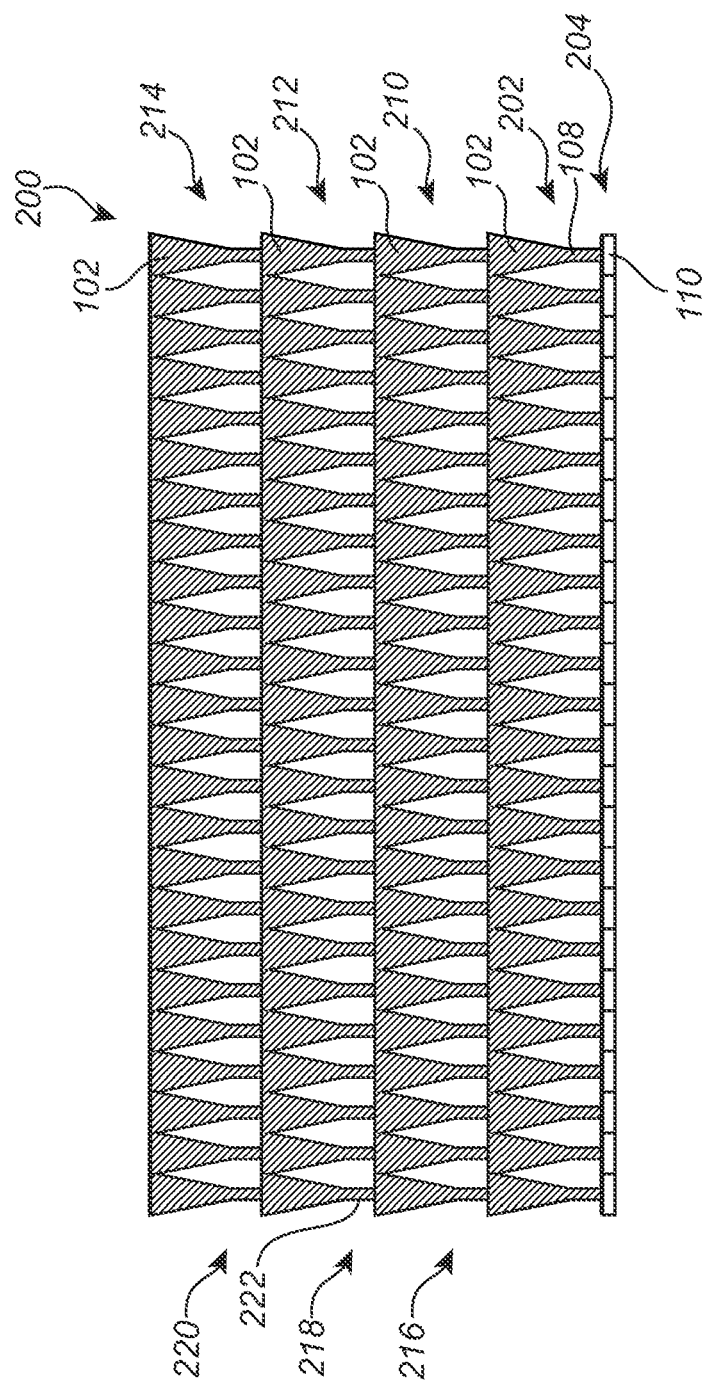
FIG. 4 is a schematic view of a detector, according to example embodiments.

Referring now to FIG. 4, it should be realized that the concept of providing two focal planes may be extended to further focal planes. Thus, there may be one or more further arrays of funnel elements to define further planes in which electromagnetic radiation being in focus may be captured by entrance ends of the funnel elements of the further array.

In FIG. 4, a second array 210 of funnel elements 102, a third array 212 of funnel elements 102 and a fourth array 214 of funnel elements 102 are illustrated. There may further be arrays 216, 218, 220 of intermediate waveguides 222, which may be configured to guide electromagnetic radiation from an exit end 106 of a funnel element 102 to an entrance end 104 of another funnel element 102 of another array below.

The funnel elements 102 of the second array 210, the third array 212 and the fourth array 214 may, like the funnel elements 102 of the array 202 be tapered between the entrance end 104 and an exit end 106. The entrance end 104 may have a size that is larger than half of a wavelength of the electromagnetic radiation, whereas the exit end 106 may have a size that is smaller than half of a wavelength of the electromagnetic radiation. As a consequence, electromagnetic radiation that is focused at the entrance end 104 is captured by the funnel element 102 to be propagated therein. However, the funnel element 102 is transparent to electromagnetic radiation having spot or beam diameters larger than about half the wavelength of electromagnetic radiation, which implies that electromagnetic radiation that is not in focus at the entrance end 104 of the funnel element 102 may pass the funnel element 102 unaffected towards the photosensitive element 110.

Similar to the waveguides 108, the intermediate waveguides 222 may be integral with funnel elements 102 and may form a second section of a component for guiding electromagnetic radiation from an entrance end 104 of a funnel element 102 to an entrance end 104 of another funnel element 102 below.

The funnel element 102 may have a tapered cross-section, whereas the intermediate waveguide 222 may have a constant cross-section. The two sections of the component may differ in that a rate of change of a size of the cross-section is larger in the funnel element 102 than in the intermediate waveguide 222. However, the intermediate waveguide 222 may also have a tapered cross-section. For instance, the funnel element 102 may have a steep tapering followed by an intermediate waveguide 222 with a gentle tapering.

Figure 5:
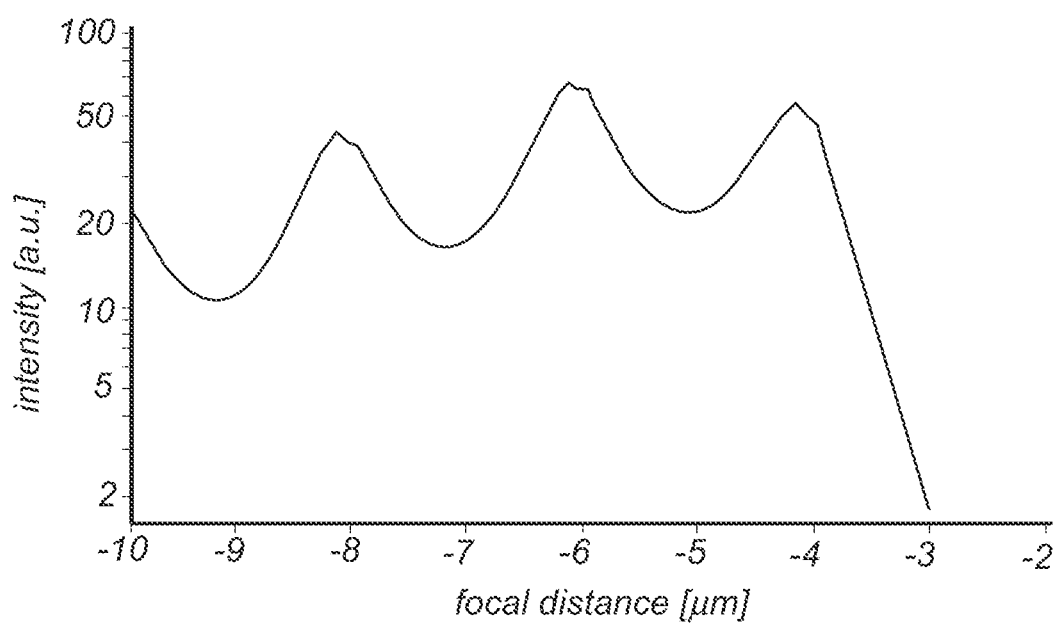
FIG. 5 is a graph illustrating intensity detected by a photosensitive element in relation to photons being focused at different distances, according to example embodiments.

Referring now to FIG. 5, an intensity detected by a photosensitive element 110 is indicated in relation to photons being focussed at different distances for a detector 200 having the first array 202, the second array 210 and the third array 212 of funnel elements 102 as shown in FIG. 4 arranged above the array 204 of photosensitive elements 110, wherein each component of a funnel element 102 and a waveguide 108 or intermediate waveguide 222 has a length of 2 μm. As is evident from FIG. 5, there are intensity peaks in the photosensitive element 110 corresponding to electromagnetic radiation being in focus at an entrance end 104 of a funnel element 102 in any of the first, second or third arrays 202, 210, 212.

It should further be realized that the image information detected by the array 204 of photosensitive elements 110 may be analyzed so as to extract particular depth information. For instance, the detector 200 may further comprise a filter for extracting particular image information corresponding to electromagnetic radiation being in focus at a particular plane.

The filter could be implemented in hardware, such as implemented in the silicon substrate 118, which may comprise transistors and other devices for handling the electric signal generated by the guided electromagnetic radiation. Alternatively, the filter could be implemented in software, such as being provided as computer-executable instructions for a processing unit which may receive the electric signals generated by the guided electromagnetic radiation.

For instance, the filter may be implemented as a relatively straightforward high-pass filter, which may be configured to detect a difference between an image region captured by the array 204 of photosensitive elements 110 being in focus and out-of-focus.

According to example embodiments, a compact camera with a lens with a focal length of 6 mm is used with an array 204 of photosensitive elements located at 6.6 µm arranged below the focal plane of the lens. The basic thin lens equation gives the following relation between a distance (depth) of the objects and the sharp image representation of this object.

Sharp image height above array of photosensitive elements: 6.00 µm, depth of the object: 59.79 m Sharp image height above array of photosensitive elements: 5.00 µm, depth of the object: 22.48 m Sharp image height above array of photosensitive elements: 4.00 µm, depth of the object: 13.84 m Sharp image height above array of photosensitive elements: 3.00 µm, depth of the object: 10.00 m Sharp image height above array of photosensitive elements: 2.00 µm, depth of the object: 7.83 m Sharp image height above array of photosensitive elements: 1.00 µm, depth of the object: 6.43 m Sharp image height at array of photosensitive elements, depth of the object: 5.46 m Thus, by arranging funnel elements to capture electromagnetic radiation at six heights above the array 204 of photosensitive elements 110, at 1, 2, 3, 4, 5, and 6 µm, respectively above the array 204 of photosensitive elements 110, depth information from vastly different distances to the objects may be detected.

Figure 6:
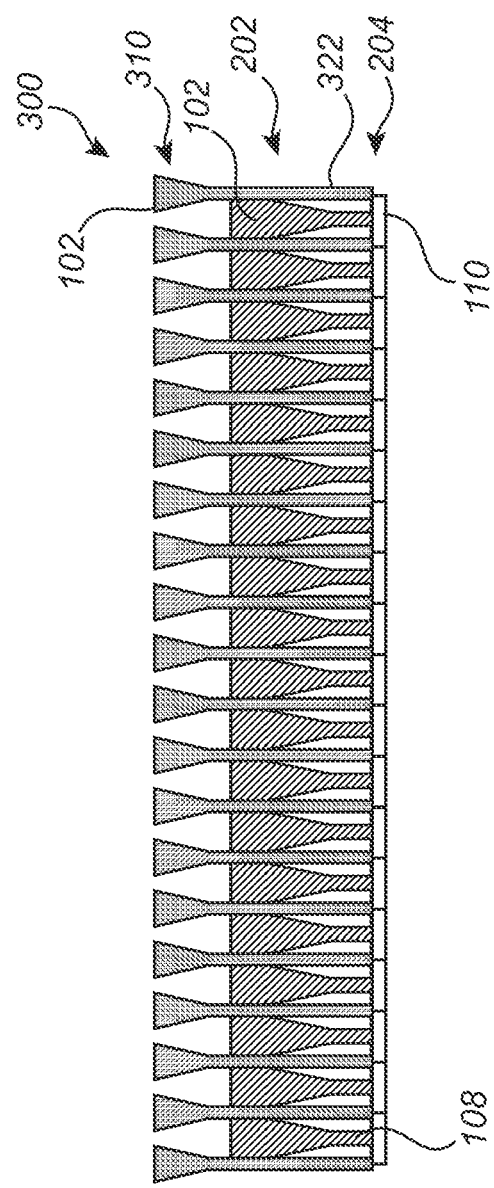
FIG. 6 is a schematic view of a detector, according to example embodiments.

Referring now to FIG. 6, a detector 300 according to another embodiment is described. In contrast to the detector 200 shown in FIG. 4, the detector 300 comprises a second array 310 of funnel elements 102 that is associated with a second array 316 of waveguides 322, wherein the waveguides 322 are configured to guide electromagnetic radiation from the funnel elements 102 to a photosensitive element 110. Hence, the waveguides 322 may extend past the second plane defined by the entrance ends 104 of the funnel elements 102 of the first array 202.

The waveguides 322 of the second array 316 and the waveguides 108 of a first array may thus be configured to guide electromagnetic radiation to different sets of photosensitive elements 110.

At first glance, this embodiment may appear to trade two-dimensional image resolution for depth information, but in reality, this is not exactly true. The waveguides 322 and the waveguides 108 and the corresponding photosensitive elements 110 can be much smaller than half of the wavelength of the light, in particular as the electromagnetic radiation may be guided through a high refractive index material. Only the entrance end 104 of the funnel elements 102 may be larger than the diffraction limit.

It should be realized that the embodiment shown in FIG. 6 may be extended in several different ways. For instance, there may be further arrays of funnel elements 102 with intermediate waveguides above each of the first array 202 of funnel elements 102 and the second array 310 of funnel elements 102 such that electromagnetic radiation in focus in further image planes may be captured and transferred to the entrance ends 104 of funnel elements 102 of each of the first array 202 and the second array 310.

Alternatively or additionally, further arrays of funnel elements 102 with waveguides configured to guide electromagnetic radiation from the funnel elements 102 to a photosensitive element 110 may be provided. Hence, the waveguides may extend past the second plane defined by the entrance ends 104 of the funnel elements 102 of the first array 202, such that several parallel arrays of waveguides for guiding electromagnetic radiation to different photosensitive elements 110 may be provided.

Figure 7:
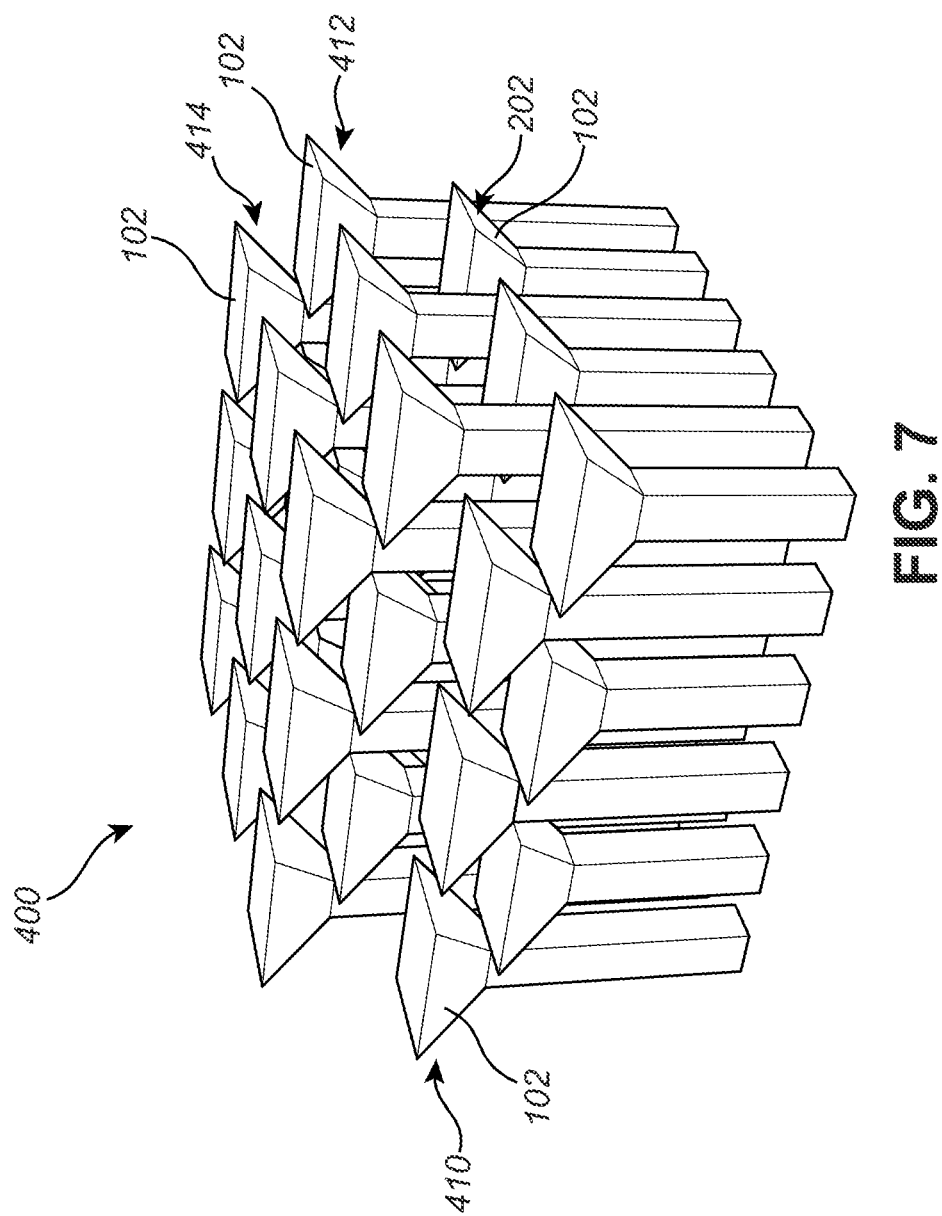
FIG. 7 is a schematic view of a detector, according to example embodiments.

For instance, as shown in FIG. 7, a detector 400 may be provided with four different arrays 202, 410, 412, 414 of funnel elements 102 with the entrance ends 104 of funnel elements 102 of different arrays 202, 410, 412, 414 each being arranged at different height above the array 204 of photosensitive elements 110. The four different arrays 202, 410, 412, 414 may be arranged in a square configuration so as not to trade two-dimensional image resolution for depth information, or at least maintain as high two-dimensional image resolution as possible.

Figure 8:
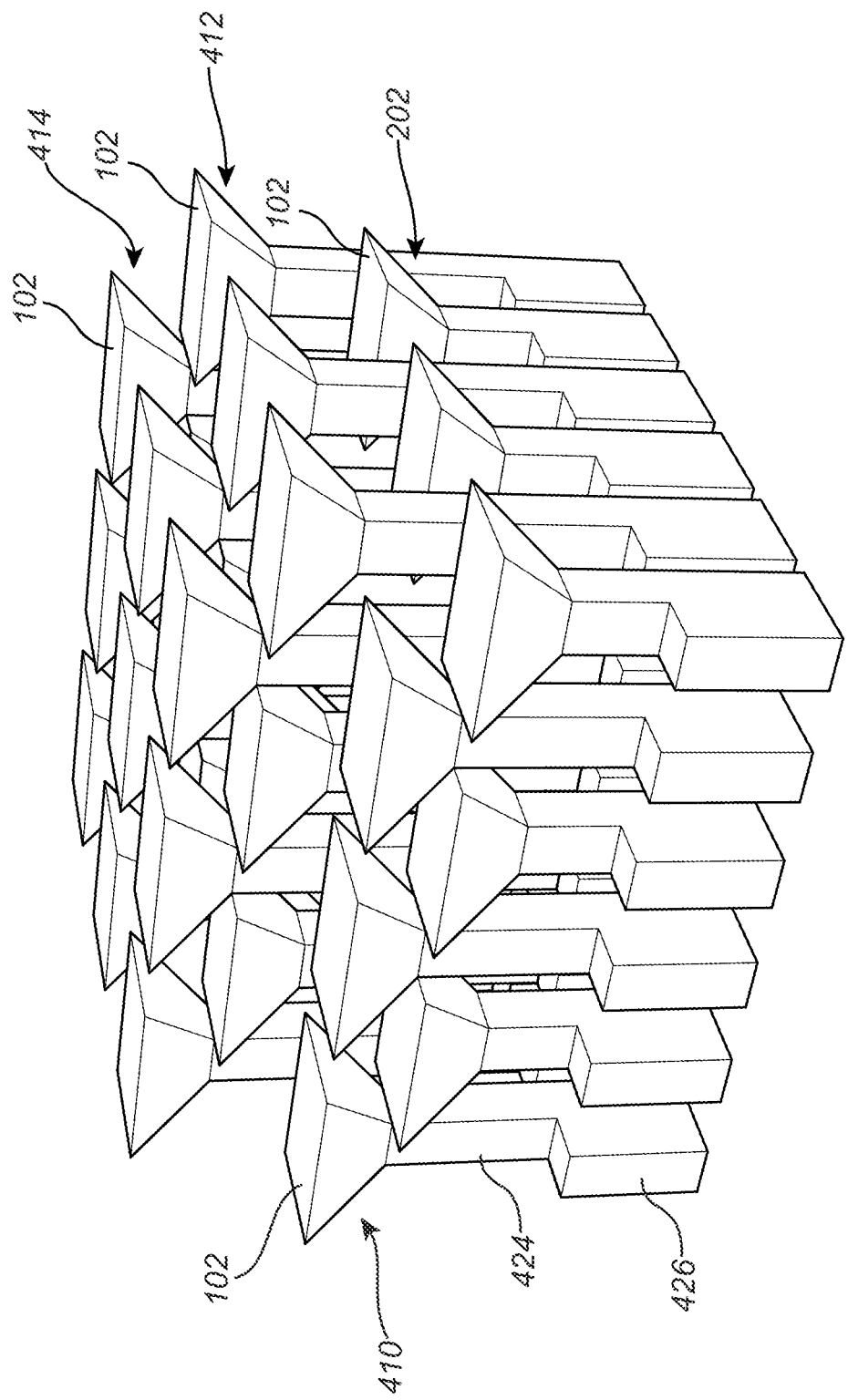
FIG. 8 is a schematic view of the detector of FIG. 7 being extended with a possibility to perform color splitting, according to example embodiments.

Referring now to FIG. 8, the embodiment shown in FIG. 7 being extended with a possibility to split guiding of electromagnetic radiation of different ranges of wavelengths will be discussed. However, it should be realized that this splitting may be provided for any waveguide configured to guide electromagnetic radiation from the funnel elements 102 to a photosensitive element 110, such as the waveguides 108 or the waveguides 322.

As shown in FIG. 8, each waveguide 422 comprises a first waveguide portion 424 and a second waveguide portion 426 for guiding incident electromagnetic radiation from a funnel element 102 towards a photosensitive element 110.

Each one of the first waveguide portions 424 may be arranged to extend in a first direction, such as a vertical direction, and may further be configured to be a single-mode waveguide for electromagnetic radiation within a wavelength range to be detected by the detector 400. In the following, an example discussion is made in relation to a detector for visible light, thus having a wavelength range in the visible part of the spectrum. Other wavelength ranges are however possible as well, such as for example infrared or ultraviolet.

Each one of the first waveguide portions 424 may extend between the funnel element 102 and the photosensitive element 110, such that incoming light can be guided from the entrance end 104 of the funnel element 102 towards the photosensitive element.

A cross section of a first waveguide portion 424, taken across the length direction or vertical direction of the first waveguide portion 424 may be substantially constant along the entire length of the waveguide portion 424. However, it is appreciated that other configurations may be employed as well, such as for example a tapered shape in which the cross section of the first waveguide portion 424 is reduced towards the photosensitive element 110, such that an angle between a sidewall of a waveguide and a cross-section of the waveguide may be less than 90°, such as approximately 85°. The choice between straight sidewalls (i.e., constant cross section) or tapered sidewalls may depend on the desired optical transmission properties, which in turn may be determined by the type of material of the waveguide, the wavelengths of the electromagnetic radiation, and the desired coupling to the second waveguide portion 426.

Each of the second waveguide portions 426 may extend along the first direction in parallel with the first waveguide portion 424, and may be configured to out-couple light within a sub-range of the wavelength range of the light in the first waveguide portion 424. In the present example, the second waveguide portions 426 may be configured to couple out for example red, green or blue light to allow those colours to be detected separately at the array 204 of photosensitive elements 110. Thus, by out-coupling a sub-range corresponding to for example red, green or blue light, a contrast in signal may be achieved between the light transmitted through the first waveguide portion 424 and the second waveguide portion 426.

The second waveguide portions 426 may, similarly to the first waveguide portions 424 be dimensioned with straight sidewalls or by one or several tapered sidewalls. The cross-sectional shape may be determined by the wavelengths that is to be out-coupled.

The second waveguide portions 426 may be arranged slightly spaced apart from the first waveguide portions 424, such that they are separated by a vertical gap extending along the length direction of the waveguide portions 424, 426. Other configurations are however possible, in which the first and second waveguide portions 424, 426 are arranged in contact with each other or formed from a single piece.

The first waveguide portion 424 and/or the second waveguide portion 426 and the funnel element 102 may be at least partly surrounded or embedded in a material having a lower refractive index than the material of the waveguide portions. Examples of such materials/surroundings may include silicon dioxide, as mentioned above.

The first and second waveguide portions 424, 426 and the funnel element 102 may be formed of a material comprising silicon, such as for instance silicon nitride.

Depending on the dimensions of the coupling region, i.e., the interface between the first and second waveguide portions 424, 426, light within the sub-range may be coupled into the second waveguide portion 426 and guided towards the photosensitive element 110 arranged at lower end portions of the first and second waveguide portions 424, 426, respectively.

It should further be realized that a plurality of second wavelength portions 426 may be used. The plurality of second waveguide portions 426, or colour splitting waveguides, may be arranged at one or several sides of the first waveguide portion 424 in order to enable more specific wavelengths to be separately detected. By arranging the second waveguide portions 426 in an array, in which light is allowed to be coupled between neighbouring ones of the second waveguide portions 426, it is possible to differentiate between a plurality of different wavelength sub-ranges.

Each photosensitive element 110 may thus be configured to receive a particular sub-range of the wavelength range that is detected by the detector 400. The signal from each photosensitive element 110 may thus represent an intensity of electromagnetic radiation of a particular sub-range.

Figure 9:
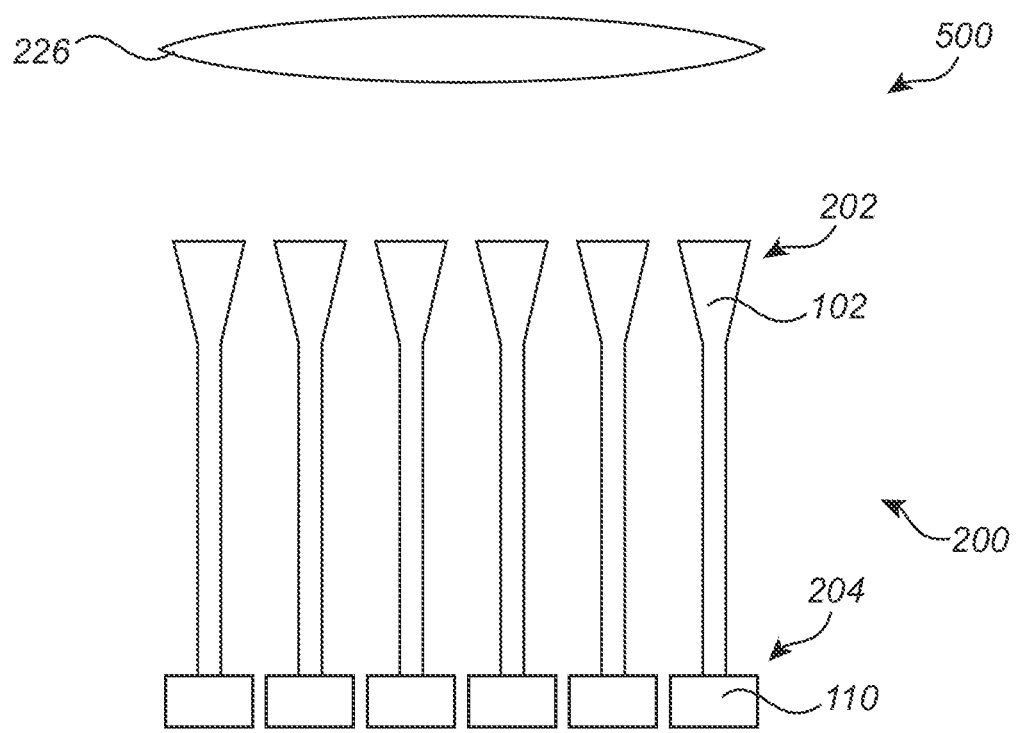
FIG. 9 is a schematic view of an image sensor, according to example embodiments.

Referring now to FIG. 9, the detector according to any one of the previously described embodiments may be integrated into an image sensor 500. The image sensor 500 may thus comprise the detector 200, which is provided with a lens 226 for focusing incident electromagnetic radiation towards the array 202 of funnel elements 102 and the array 204 of photosensitive elements 110.

The image sensor 500 may further comprise an additional optical system for guiding electromagnetic radiation or controlling electromagnetic radiation being received by the detector 200.

As discussed above, the array 204 of photosensitive elements 110 may be configured to capture image information in at least two image planes. The image sensor 500 may be configured to directly present the sensed signals of the array 204 of photosensitive elements 110 as an image from several image planes, but may alternatively be configured to extract image information corresponding to a particular image plane from the image information captured by the array 204 of photosensitive elements 110 for display of the particular image plane.

It should further be realized that in some embodiments, the image information captured by the array 204 of photosensitive elements 110 may be directly analyzed without a need to form an image of the captured image information. For instance, the captured image information may be used for determining presence of an object at a particular depth corresponding to electromagnetic radiation being in focus at a particular image plane. This may be used in order to quickly and accurately determine distances to objects, which may be very useful input e.g. in autonomous driving applications.

Figure 10:
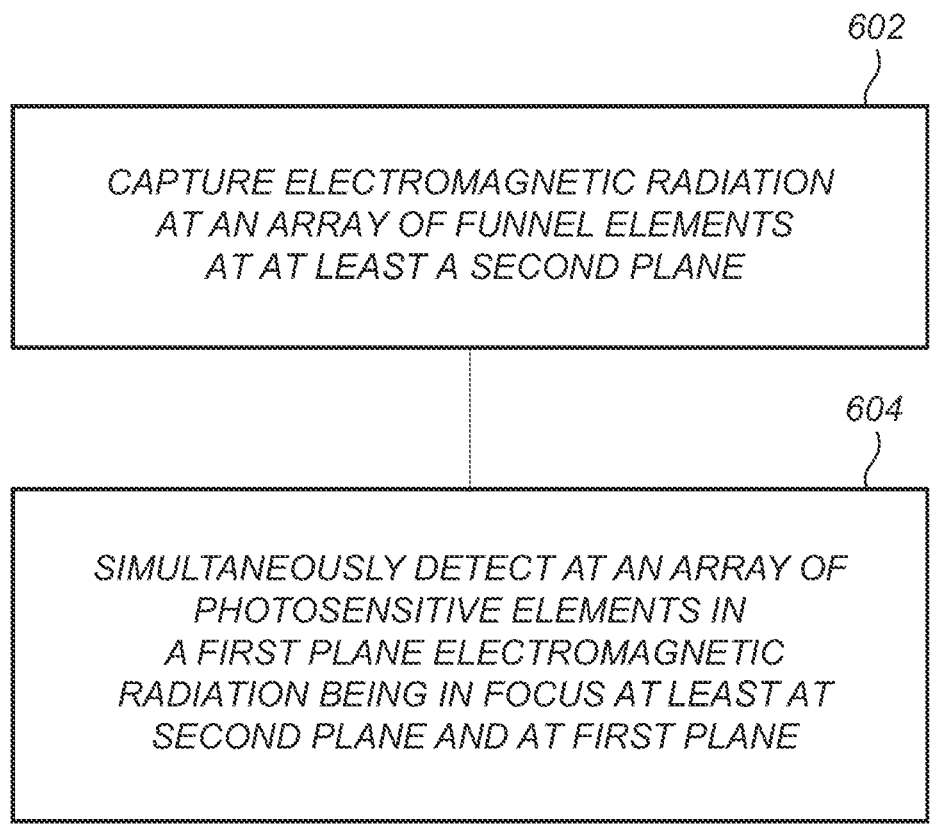
FIG. 10 is a flowchart of a method, according to example embodiments.

Referring now to FIG. 10, a method for detecting image information according to an embodiment will be described.

The method comprises capturing 602 electromagnetic radiation at an array of funnel elements for propagating electromagnetic radiation from a second plane towards a first plane. The second plane is defined by the entrance ends of the funnel elements of the array. The entrance end of each funnel element has a size larger than half of a wavelength of electromagnetic radiation for capturing electromagnetic radiation in focus at the second plane.

The method further comprises at an array of photosensitive elements, simultaneously detecting 604 electromagnetic radiation being captured by the array of funnel elements for detecting image information corresponding to electromagnetic radiation being in focus at the second plane and detecting electromagnetic radiation having passed the array of funnel elements for detecting image information corresponding to electromagnetic radiation being in focus at the first plane.

Electromagnetic radiation may also be captured at one or more additional planes defined by entrance ends of funnel elements of further array(s) for propagating electromagnetic radiation in focus at the additional plane(s) towards the array of photosensitive elements.

Thus, based on the presently described method, image information corresponding to electromagnetic radiation being in focus in at least a first plane and a second plane may be simultaneously detected, such that two-dimensional image information together with depth information may be simultaneously detected in the array of photosensitive elements.

In the above, the disclosure has mainly been described with reference to a limited number of examples. However, as is readily appreciated, other examples than the ones disclosed above are equally possible within the scope of the disclosure, as defined by the appended claims.

The invention claimed is:

1. A detector for detecting electromagnetic radiation spanning a range from a first wavelength to a second wavelength, wherein the first wavelength is a shortest wavelength in the range and the second wavelength is a longest wavelength in the range, and wherein the detector comprises:

an array of funnel elements for propagating electromagnetic radiation from a second plane towards a first plane, wherein each of the funnel elements comprises an entrance end and an exit end, wherein the entrance ends of the array of funnel elements define the second plane, wherein each of the entrance ends has a size larger than half of the second wavelength of electromagnetic radiation in a medium from which the electromagnetic radiation enters the detector, wherein each of the funnel elements is configured to:

capture electromagnetic radiation in focus at the second plane at the entrance end;

propagate the electromagnetic radiation that is in focus at the second plane to the exit end; and allow electromagnetic radiation that is in focus at the first plane to pass the entrance end and propagate to the first plane without influence by the funnel element, and wherein each of the exit ends has a size smaller than half of the first wavelength of electromagnetic radiation in the medium; and an array of photosensitive elements for detecting electromagnetic radiation incident on the array of photosensitive elements, wherein each funnel element is associated with a photosensitive element such that image information corresponding to electromagnetic radiation being in focus at the second plane is detected by the array of photosensitive elements, and wherein the array of photosensitive elements defines the first plane and is configured to further capture image information corresponding to electromagnetic radiation that is in focus at the first plane.

2. The detector according to claim 1, wherein the funnel elements have at least one sidewall that is non-parallel to an extension of the funnel element from the entrance end to the exit end.

3. The detector according to claim 1, further comprising a first array of waveguides, wherein each waveguide is configured to guide electromagnetic radiation from the exit end of a funnel element to a photosensitive element.

4. The detector according to claim 3, wherein the waveguides comprise a first waveguide portion and a second waveguide portion, wherein the first waveguide portion is configured to guide electromagnetic radiation within a wavelength range, wherein the second waveguide extends in parallel with the first waveguide portion and is configured to selectively guide electromagnetic radiation within a sub-range of the wavelength range, and wherein the second waveguide portion is coupled to the first waveguide portion and configured to out-couple electromagnetic radiation from the first waveguide portion within the sub-range of the wavelength range.

5. The detector according to claim 1, wherein the array of funnel elements is a first array of funnel elements, wherein the detector further comprises a second array of funnel elements for propagating electromagnetic radiation from a third plane towards the first plane, wherein each of the funnel elements of the second array comprises an entrance end and an exit end, wherein the entrance ends of the second array of funnel elements define the third plane, wherein the entrance end has a size larger than half of the second wavelength of electromagnetic radiation in the medium for capturing electromagnetic radiation in focus at the third plane, and wherein the exit end has a size smaller than half of the first wavelength of electromagnetic radiation in the medium.

6. The detector according to claim 5, further comprising an array of intermediate waveguides, wherein each intermediate waveguide is configured to guide electromagnetic radiation from the exit end of a funnel element of the second array to an entrance end of a funnel element of the first array.

7. The detector according to claim 5, further comprising a second array of waveguides, wherein each waveguide in the second array is configured to guide electromagnetic radiation from the exit end of a funnel element of the second array to a photosensitive element.

8. The detector according to claim 1, wherein the array of photosensitive elements comprises different sets of photosensitive elements for capturing image information corresponding to electromagnetic radiation being in focus at different planes.

9. The detector according to claim 1, wherein the funnel elements are formed by a high refractive index material and are surrounded by a lower refractive index material.

10. The detector according to claim 1, wherein the array of photosensitive elements comprises a photoactive layer for generating a signal corresponding to an amount of incident electromagnetic radiation on the photoactive layer.

11. The detector according to claim 10, wherein the array of photosensitive elements further comprises an interconnect layer for transferring the signal from the photoactive layer to a semiconductor circuit.

12. The detector according to claim 1, wherein the detector comprises a single lens for focusing incident electromagnetic radiation towards the array of funnel elements and the array of photosensitive elements.

13. The detector according to claim 1, further comprising a filter for extracting image information corresponding to electromagnetic radiation being in focus at a particular plane.

14. A method for detecting image information, wherein the method comprises:

capturing electromagnetic radiation spanning a range from a first wavelength to a second wavelength, wherein the first wavelength is a shortest wavelength in the range and the second wavelength is a longest wavelength in the range, wherein the electromagnetic radiation is captured by a detector at an array of funnel elements for propagating electromagnetic radiation from a second plane towards a first plane, wherein each of the funnel elements comprises an entrance end and an exit end, wherein the entrance ends of the funnel elements define the second plane, wherein the entrance end of each funnel element has a size larger than half of the second wavelength of electromagnetic radiation in a medium from which the electromagnetic radiation enters the detector, wherein each of the funnel elements is configured to:

capture electromagnetic radiation in focus at the second plane at the entrance end;

propagate the electromagnetic radiation that is in focus at the second plane to the exit end; and allow electromagnetic radiation that is in focus at the first plane to pass the entrance end and propagate to the first plane without influence by the funnel element, and wherein each of the exit ends of the funnel elements has a size smaller than half of the first wavelength of electromagnetic radiation in the medium; and at an array of photosensitive elements, simultaneously detecting electromagnetic radiation being captured by the array of funnel elements for detecting image information corresponding to electromagnetic radiation being in focus at the second plane and detecting electromagnetic radiation having passed the array of funnel elements for detecting image information corresponding to electromagnetic radiation being in focus at the first plane.

15. An image sensor configured to detect three-dimensional image information based on simultaneously capturing image information in at least two image planes, wherein the image sensor comprises a detector for detecting electromagnetic radiation spanning a range from a first wavelength to a second wavelength, wherein the first wavelength is a shortest wavelength in the range and the second wavelength is a longest wavelength in the range, and wherein the detector comprises:
- an array of funnel elements for propagating electromagnetic radiation from a second plane towards a first plane, wherein each of the funnel elements comprises an entrance end and an exit end, wherein the entrance ends of the array of funnel elements define the second plane, wherein each of the entrance ends has a size larger than half of the second wavelength of electromagnetic radiation in a medium from which the electromagnetic radiation enters the detector, wherein each of the funnel elements is configured to:
  - capture electromagnetic radiation in focus at the second plane at the entrance end;
  - propagate the electromagnetic radiation that is in focus at the second plane to the exit end; and
  - allow electromagnetic radiation that is in focus at the first plane to pass the entrance end and propagate to the first plane without influence by the funnel element, and
  wherein each of the exit ends has a size smaller than half of the first wavelength of electromagnetic radiation in the medium; and
- an array of photosensitive elements for detecting electromagnetic radiation incident on the array of photosensitive elements, wherein each funnel element is associated with a photosensitive element such that image information corresponding to electromagnetic radiation being in focus at the second plane is detected by the array of photosensitive elements, and wherein the array of photosensitive elements defines the first plane and is configured to further capture image information corresponding to electromagnetic radiation being in focus at the first plane.

16. The image sensor according to claim 15, wherein the funnel elements have at least one sidewall that is non-parallel to an extension of the funnel element from the entrance end to the exit end.

17. The image sensor according to claim 15, wherein the detector further comprises a first array of waveguides, and wherein each waveguide is configured to guide electromagnetic radiation from the exit end of a funnel element to a photosensitive element.

18. The image sensor according to claim 17, wherein the waveguides comprise a first waveguide portion and a second waveguide portion, wherein the first waveguide portion is configured to guide electromagnetic radiation within a wavelength range, wherein the second waveguide extends in parallel with the first waveguide portion and is configured to selectively guide electromagnetic radiation within a sub-range of the wavelength range, and wherein the second waveguide portion is coupled to the first waveguide portion and configured to out-couple electromagnetic radiation from the first waveguide portion within the sub-range of the wavelength range.

19. The image sensor according to claim 15, wherein the array of funnel elements is a first array of funnel elements, wherein the detector further comprises a second array of funnel elements for propagating electromagnetic radiation from a third plane towards the first plane, wherein each of the funnel elements of the second array comprises an entrance end and an exit end, wherein the entrance ends of the second array of funnel elements define the third plane, wherein the entrance end has a size larger than half of the second wavelength of electromagnetic radiation in the medium for capturing electromagnetic radiation in focus at the third plane, and wherein the exit end has a size smaller than half of the first wavelength of electromagnetic radiation in the medium.

20. The image sensor according to claim 19, wherein the detector further comprises an array of intermediate waveguides, and wherein each intermediate waveguide is configured to guide electromagnetic radiation from the exit end of a funnel element of the second array to an entrance end of a funnel element of the first array.

\* \* \* \* \*